United States Patent
Adam

(10) Patent No.: US 11,735,895 B2
(45) Date of Patent: Aug. 22, 2023

(54) LENGTH OF CABLE RUN HAVING A FISH-PLATED END

(71) Applicants: LEGRAND FRANCE, Limoges (FR); LEGRAND SNC, Limoges (FR)

(72) Inventor: Damien Adam, Domfront en Champagne (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 0 days.

(21) Appl. No.: 17/762,296

(22) PCT Filed: Mar. 12, 2021

(86) PCT No.: PCT/EP2021/056398
§ 371 (c)(1),
(2) Date: Mar. 21, 2022

(87) PCT Pub. No.: WO2021/180955
PCT Pub. Date: Sep. 16, 2021

(65) Prior Publication Data
US 2022/0416524 A1 Dec. 29, 2022

(30) Foreign Application Priority Data
Mar. 13, 2020 (FR) ...................................... 2002522

(51) Int. Cl.
*H02G 3/04* (2006.01)
*H02G 3/06* (2006.01)

(52) U.S. Cl.
CPC ......... *H02G 3/0443* (2013.01); *H02G 3/0608* (2013.01)

(58) Field of Classification Search
CPC .......................... H02G 3/0443; H02G 3/0608
See application file for complete search history.

(56) References Cited

U.S. PATENT DOCUMENTS

| 3,119,472 A | * | 1/1964 | McLeod | ................... F16B 2/02 411/389 |
| 6,193,434 B1 | * | 2/2001 | Durin | ................... H02G 3/0443 403/309 |

(Continued)

FOREIGN PATENT DOCUMENTS

| EP | 0 973 238 | 1/2000 |
| EP | 2 276 129 | 1/2011 |

(Continued)

OTHER PUBLICATIONS

International Search Report for PCT/EP2021/056398 dated Jun. 9, 2021, 6 pages.

(Continued)

*Primary Examiner* — Amy J. Sterling
(74) *Attorney, Agent, or Firm* — Nixon & Vanderhye

(57) ABSTRACT

Disclosed is a length of cable run made of metal wire mesh having a nominal end and a fish-plated end equipped with a fish plate made of metal wires which is configured to allow the fish-plated end to be assembled by clip-fastening with the nominal end of a similar length of cable run; lateral parts of the fish plate each including a flexible arm, a head provided with a ramp and with a clip and connected to the flexible arm by one of its ends, and a spacer secured to the end cross wire of the fish-plated end and situated between this end cross wire and the end cross wire of the nominal end of the similar length when the fish-plated end of the length and the nominal end of the similar length are assembled.

20 Claims, 6 Drawing Sheets

(56) References Cited

U.S. PATENT DOCUMENTS

| | | | |
|---|---|---|---|
| 6,239,364 B1 | 5/2001 | Nickel | |
| 9,525,277 B2* | 12/2016 | Valdes Colina | H02G 3/0443 |
| 2005/0063775 A1* | 3/2005 | Boltz | H02G 3/0443 |
| | | | 403/397 |
| 2007/0164181 A1* | 7/2007 | Deciry | H02G 3/0443 |
| | | | 248/251 |
| 2014/0151513 A1* | 6/2014 | Valdes Colina | H02G 3/0443 |
| | | | 248/49 |
| 2014/0216809 A1* | 8/2014 | Mayo | A47B 57/581 |
| | | | 174/503 |
| 2015/0260935 A1* | 9/2015 | Williams | H02G 3/0437 |
| | | | 362/217.14 |
| 2017/0271855 A1 | 9/2017 | Valdes Colina | |
| 2021/0126440 A1* | 4/2021 | Valdés Colina | H02G 3/0443 |
| 2021/0126441 A1* | 4/2021 | Valdés Colina | F16L 3/26 |

FOREIGN PATENT DOCUMENTS

| | | |
|---|---|---|
| EP | 2 671 295 | 12/2013 |
| EP | 2 733 803 | 5/2014 |
| EP | 2 816 687 | 12/2014 |
| EP | 3 139 460 | 3/2017 |
| ES | 2 316 256 | 4/2009 |
| ES | 1 076 189 | 2/2012 |
| ES | 1 078 809 | 3/2013 |
| ES | 2 435 736 | 12/2013 |
| FR | 2 971 099 | 8/2012 |
| FR | 3 007 590 | 12/2014 |
| FR | 3 007 591 | 12/2014 |
| FR | 3 007 592 | 12/2014 |
| FR | 3 040 555 | 3/2017 |
| WO | 2012/104545 | 8/2012 |
| WO | 2015/181421 | 12/2015 |
| WO | 2019/077172 | 4/2019 |
| WO | 2019/077173 | 4/2019 |

OTHER PUBLICATIONS

Written Opinion of the ISA for PCT/EP2021/056398 dated Jun. 9, 2021, 7 pages.

* cited by examiner

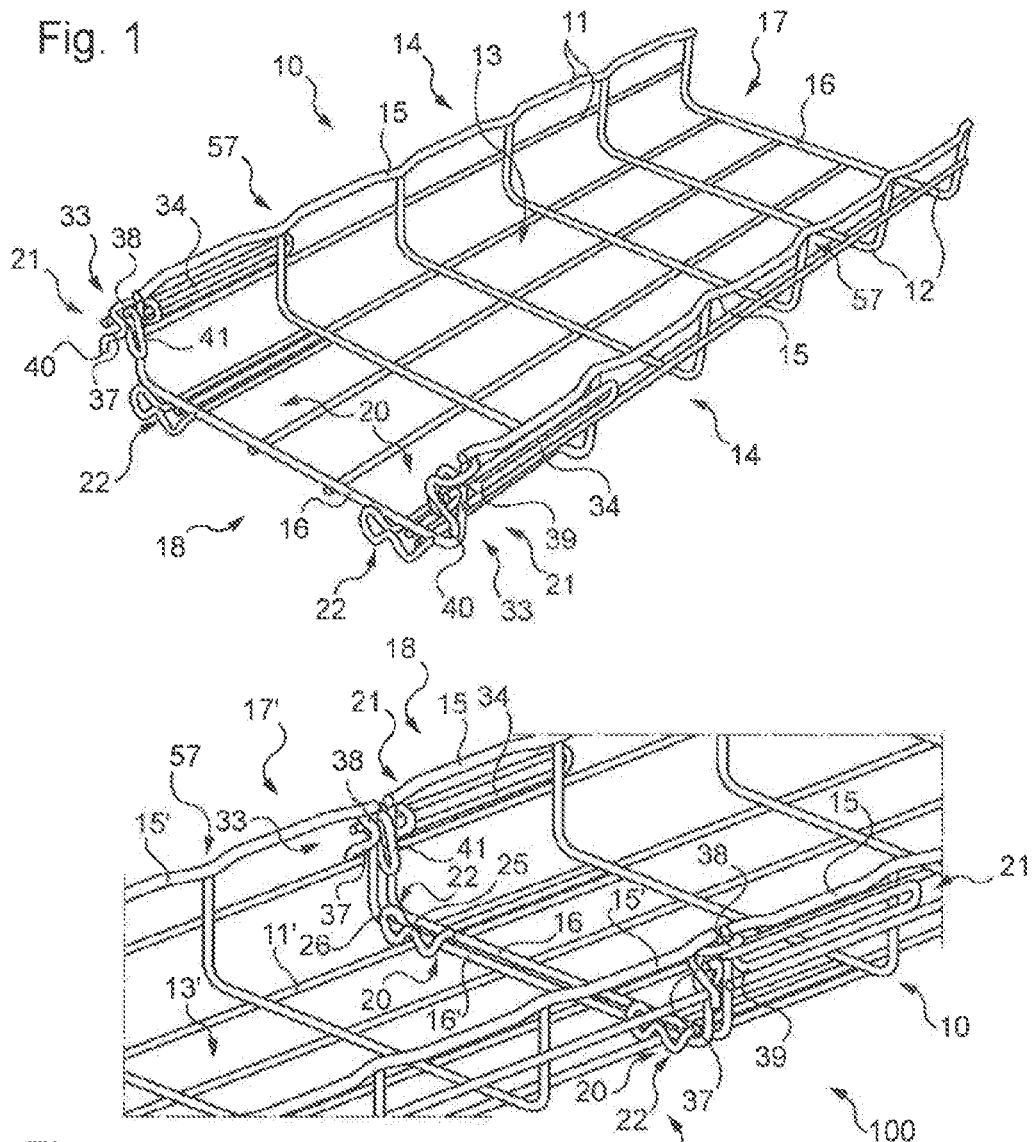
Fig. 1
Fig. 2
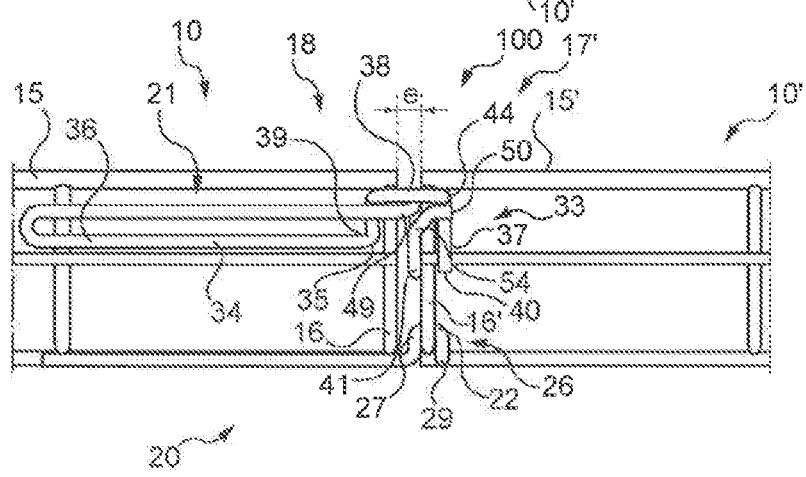
Fig. 3

LENGTH OF CABLE RUN HAVING A FISH-PLATED END

This application is the U.S. national phase of International Application No. PCT/EP2021/056398 filed Mar. 12, 2021 which designated the U.S. and claims priority to FR Patent Application No. 2002522 filed Mar. 13, 2020, the entire contents of each of which are hereby incorporated by reference.

TECHNICAL FIELD OF THE INVENTION

The invention relates to the conveyance of cables in apertured cable raceways having a bottom and lateral side walls.

STATE OF THE ART

It is known that such cable raceways are commonly used to run electric cables or similar, for example pneumatic lines, along the walls of certain premises, in particular along a wall or a ceiling.

In general, these cable raceways are formed by a plurality of lengths of cable raceway assembled end-to-end, each length of cable raceway being formed by a folded piece of perforated sheet metal or by a trellis of metal wires.

Conventionally, a length of cable raceway of metal wire trellis comprises longitudinal warp wires welded to U-shaped transverse weft wires, whereby said length of cable raceway has a bottom and two side walls, said length of cable raceway terminating at each end with a farthermost weft wire, each side wall ending at its apex with a farthermost warp wire called edging wire.

It is furthermore known that for the end-to-end assembly of the lengths of cable raceway, accessories known as splice members are conventionally used. Initially, the splice members were installed manually one by one.

To facilitate the end-to-end assembly of the lengths of cable raceway of metal wire trellis, it has already been proposed, in particular by European patent patent application EP 0 973 238, to which corresponds U.S. Pat. No. 6,239,364, to differently shape the ends of the lengths of cable raceway: each length has a first end narrowed with regard to width and height while the second end is not narrowed with regard to width and height; or else the first end is narrowed and the second end is widened; or else the first end is not narrowed and the second end is widened (respectively with regard to width and height), which means that the first end of a length can be inserted into the second end of another length transversely relative to the direction of longitudinal extension of the lengths.

It has also been proposed, in particular by Spanish patent application ES 2 316 256, by European patent application EP 2 276 129, by European patent application EP 2 733 803 to which corresponds United States patent US 2014/0151513, by Spanish utility model ES 1 076 189, by Spanish patent application ES 2 435 736, by Spanish utility model ES 1 078 809, by French patent application 3 007 590, by French patent application 3 007 591, by French patent application 3 007 592 to which corresponds European patent application EP 2 816 687, by PCT application WO 2015/181421 to which corresponds United States application US 2017/0271855, by French patent application 3 040 555 to which corresponds European patent application EP 3 139 460, by international application WO 2019/77172 and by international application WO 2019/77173, for each length of cable raceway to have a nominal end, that is to say conventional, and an end equipped with metal wire splicing configured to enable that end to be assembled by snap engagement with the nominal end of a similar length of cable raceway in a snap-engagement configuration in which the length of cable raceway and the similar length of cable raceway are held end-to-end by the metal wire splicing.

In each of the aforementioned solutions, the elastic deformation which enables the snap engagement of the two lengths of cable raceway mainly involves a modification of angular position of at least one side wall relative to the bottom, in the neighborhood of the splice end.

It has moreover been proposed, in particular by French patent application 2 971 099, to which corresponds European patent application EP 2 671 295, a splice member of metal wires provided to be premounted on one of the ends of a length of cable raceway of metal wire trellis, which then, just as for the aforementioned lengths of cable raceway, has one end provided with metal wire splicing configured to enable that end to be assembled by snap-fastening with the nominal end of a similar length of cable raceway in a snap-engagement configuration in which the length of cable raceway and the similar length of cable raceway are held end-to-end, but in contrast to the aforementioned lengths of cable raceway, the elastic deformation that enables the snap engagement of the two lengths of cable raceway mainly involves a deformation of the splicing of metal wire (and not a modification of angular position of at least one side wall relative to the bottom, in the neighborhood of the splice end), which is more convenient.

More specifically, in French patent application 2 971 099, to which corresponds European patent application EP 2 671 295, there is disclosed a length of cable raceway having a nominal end and a splice end provided with metal wire splicing configured to enable said splice end to be assembled by snap engagement with the nominal end of a similar length of cable raceway in a snap engaged configuration in which said length of cable raceway and said similar length of cable raceway are held end-to-end, said snap engagement taking place by a movement of bringing together said splice end of said length and said nominal end of said similar length in a direction transverse to said bottom of said length and to said bottom of said similar length, said splicing, in course of this movement of bringing together, elastically deforming in contact with said similar length then relaxing to retain said similar length.

The splicing comprises a generally U-shaped central wire quite close to the shape of the weft wires except that it has a bend at its end, two end wires in the general shape of bicycle drop handlebars and at least one bottom wire of a rider. Each end wire and each bottom wire is disposed transversely to the central wire. Each end wire connects by its center to one of the ends of the central wire, that is to say to the distal end of one of the flanking lengths of the central wire. Each bottom wire connects by its center to the bottom length of the central wire. The splicing thus comprises a bottom part formed by the bottom length of the central wire and by the bottom wire or wires; and two lateral parts each formed by one of the flanking lengths of the central wire and by the end wire which is connected to the distal end of the flanking length.

At the time of the snap engagement, the bottom wires forming stops for the bottom of the nominal end of the similar length to oppose the continuation of said movement of bringing together when said similar length reaches the position aimed for in which it is end-to-end with said length.

For each lateral part, the central wire forms a flexible arm having a proximal end assembled to said length and having a distal end connected to the center of the end wire of bicycle drop handlebar shape, which forms a head. In this head, each distal length forms a ramp portion and the central part forms a rider of which each end is connected to one of the ramp portions. In an unbiased condition, each lateral part has a configuration in which the rider is under the edging wire in a position suitable for retaining together the farthermost weft wire of the splice end of said length and the farthermost weft wire of the nominal end of said similar length.

Said head and said flexible arm are configured such that in the course of said movement of bringing together, the edging wire of the nominal end of said similar length encounters the corresponding ramp portion and drives it to move the rider away from its position under the edging wire by deformation of said flexible arm, until the edging wire of the nominal end of said similar length has passed beyond said ramp portion, the flexible arm then relaxing while returning the rider to its position under the edging wire.

In snap-engaged position, the central wire is accommodated between the farthermost weft wire of the splice end for said length and the farthermost weft wire of the nominal end of said similar length and makes it possible to ensure a predetermined separation between these two farthermost weft wires.

DISCLOSURE OF THE INVENTION

The invention is directed to providing a length of cable raceway of metal wire trellis having a nominal end and a splice end provided with metal wire splicing having improved performance relative to such a length disclosed by French patent application 2 971 099, to which corresponds European patent application EP 2 671 295, while being of the same kind, that is to say configured to enable said splice end to be assembled by snap engagement with the nominal end of a similar length of cable raceway in a snap engaged configuration in which said length of cable raceway and said similar length of cable raceway are held end-to-end, said snap engagement taking place by a movement of bringing together said splice end of said length and said nominal end of said similar length in a direction transverse to said bottom of said length and to said bottom of said similar length, said splicing, in course of this movement of bringing together, elastically deforming in contact with said similar length then relaxing to retain said similar length.

In particular, better performance is aimed at in the implementation of the snap engagement operation and in the strength properties of the assembly after snap engagement, while the operator only acts to implement the aforementioned movement of bringing together.

To that end, the invention provides, according to a first aspect, a length of cable raceway of metal wire trellis, comprising longitudinal warp wires welded to U-shaped transverse weft wires, whereby said length of cable raceway has a bottom and two side walls, said length of cable raceway terminating at each end with a farthermost weft wire, each side wall ending at its apex with a farthermost warp wire called edging wire. said length of cable raceway having a nominal end and a splice end provided with metal wire splicing configured to enable said splice end to be assembled by snap engagement with the nominal end of a similar length of cable raceway in a snap-engaged configuration in which said length of cable raceway and said similar length of cable raceway are held end-to-end, said snap engagement taking place by a movement of bringing together said splice end of said length and said nominal end of said similar length in a direction transverse to said bottom of said length and to said bottom of said similar length, said splicing, in course of this movement of bringing together, elastically deforming in contact with said similar length then relaxing to retain said similar length; said splicing comprising a bottom part and two lateral parts; said bottom part comprising stop members configured to cooperate with the bottom of the nominal end of said similar length to oppose the continuation of said movement of bringing together for said similar length when the latter is end-to-end with said length; each said lateral part comprising a head and a flexible arm having a distal end connected to the head and having a proximal end assembled to said length, said head comprising a ramp portion and a rider connected to the ramp portion; in an unbiased condition, each said lateral part taking a configuration in which the rider is under the edging wire in a position suitable for retaining together the farthermost weft wire of the splice end of said length and the farthermost weft wire of the nominal end of said similar length; said head and said flexible arm are configured such that in the course of said movement of bringing together, the edging wire of the nominal end of said similar length encounters the ramp portion and drives it to move the rider away from its position under the edging wire by deformation of said flexible arm, until the edging wire of the nominal end of said similar length has passed beyond said ramp portion, the flexible arm then relaxing while returning the rider to its position under the edging wire. characterized in that said head is connected to said flexible arm by one of its ends; and each said lateral part comprises in addition to said head and said flexible arm, a spacer mechanically connected to said farthermost weft wire of said splice end of said length, said spacer being located, in said snap-engaged configuration, between said farthermost weft wire of said splice end of said length and said farthermost weft wire of the nominal end of said similar length.

Thus, whereas in the lateral parts of the splicing disclosed by French patent application 2 971 099, to which corresponds European patent application EP 2 671 295, it is by its center that the head is attached to the flexible arm, in the splicing comprised by the length according to the invention, it is by one of its ends that the head is attached to the flexible arm.

The invention is based on the observation that with this modification of the arrangement of the lateral parts of the splicing, it is possible to ensure a predetermined separation between the two farthermost weft wires (that of the splice end of said length and that of the nominal end of said similar length) by a distinct spacer of the flexible arm, mechanically connected to the farthermost weft wire of said splice end of said length.

It is thus possible at the same time to improve the freedom of movement of the flexible arm and the quality of maintaining the separation between the two farthermost weft wires.

The improvement of the freedom of movement of the flexible arm makes the snap engagement more convenient and more secure.

The improvement in the quality of maintaining the separation between the two farthermost weft wires is favorable to the strength properties of the assembly after snap engagement. As a matter of fact, in use, when the cable raceway is loaded while it is supported by fastening or support members located in general at a distance from the ends of the lengths composing the cable raceway, the junction between two lengths has a tendency to spread apart at the bottom and come together at the apex of the side walls. Maintaining the separation, in particular by the proper capacity for taking up forces which the spacer of the lateral parts provides, makes it possible to avoid the farthermost weft wires being displaced under the effect of the forces, and thus makes it possible to avoid them coming free of the lateral parts of the splicing.

Snap engagement strength properties of the assembly are thus obtained that are particularly robust.

According to features which are favorable to the performance of the length of cable raceway according to the invention:

said end of said head by which said head connects to said flexible arm is located between the farthermost weft wire of said splice end of said length and the weft wire preceding it;

in said snap-engaged configuration, said end of said head by which said head connects to said flexible arm is located between the farthermost weft wire of said nominal end of said similar length and the weft wire preceding it;

said proximal end of said flexible arm is fastened to the side wall of said length with which cooperates said head;

said flexible arm extends longitudinally between two warp wires of said side wall of said length.

said proximal end of said flexible arm is fastened on the bottom of said length;

said proximal end of said flexible arm connects to one of said stop members;

said distal end of said flexible arm connects to said ramp portion;

said spacer has at least two branches each extending transversely to the plane of the side wall of said length with which said head cooperates;

each lateral part is formed by a single metal wire;

said lateral part comprises a U-shaped base having a bottom and two arms each extending from a respective end of said bottom, one of said arms forming said flexible arm, the other of said arms connecting to said spacer;

said U-shaped base is against the side of said weft wires that faces the towards outside of said length; and/or said head and said flexible arm are formed by a first of said metal wires and said spacer is formed by a second of said metal wires that is distinct from said first metal wire.

According to a second aspect, the invention also relates to an assembly comprising a length of cable raceway as disclosed above and a similar length of cable raceway.

BRIEF DESCRIPTION OF THE DRAWINGS

The disclosure of the invention will now be continued with the description of embodiments, given below by way of illustrative and non-limiting examples, with reference to the accompanying drawings.

FIG. 1 is a perspective illustration of a length of cable raceway according to the invention, of which one of the ends is nominal (conventional) and the other is provided with metal wire splicing.

FIG. 2 shows the length of cable raceway illustrated in FIG. 1 and a similar length of cable raceway which are assembled end-to-end by snap engagement, the lengths be being partly visible.

FIG. 3 is a side elevation view of the splice end and of the nominal end illustrated in FIG. 2, viewed from the left.

DETAILED DESCRIPTION

Figure 4:
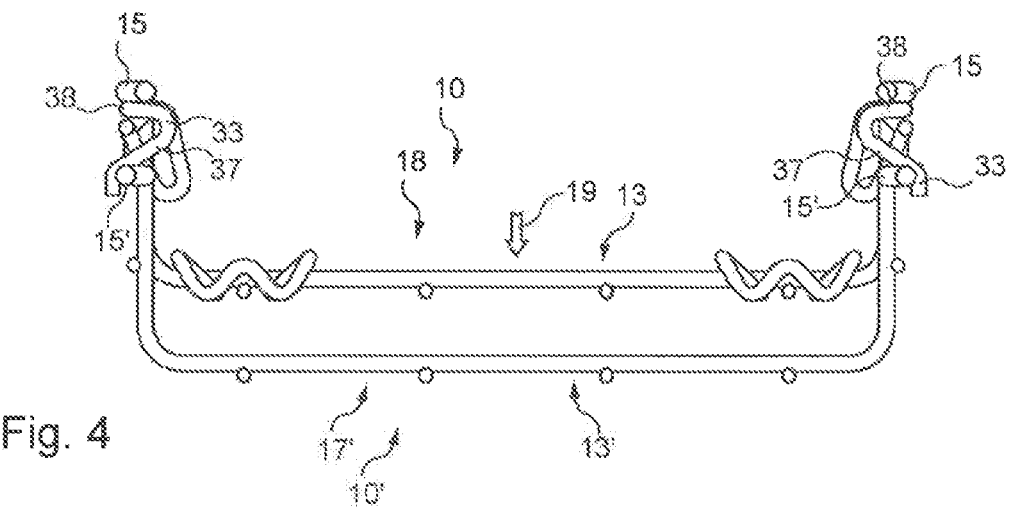
FIG. 4 is a front elevation view of the length illustrated in FIG. 1 during assembly with a similar length, the similar length being viewed on a transverse section taking mid-way between the weft wire terminating its nominal end and the weft wire preceding it, lateral parts of the splicing being in an initial configuration which they adopt in the absence of applied force.

The length of cable raceway 10 illustrated in FIG. 1 is of metal wire trellis, that is to say longitudinally extending warp wires 11 and transversely extending weft wires 12, that are U-shaped, with a weld at each intersection between a warp wire 11 and a weft wire 12.

The length of cable raceway 10 thus has a bottom 13 and two side walls 14.

Each side wall 14 terminates at its apex by a farthermost warp wire 11 called edging wire 15.

The edging wire 15 is against the end surface of each of the weft wires 12.

In the neighborhood of each weft wire 12, the edging wire 15 has a portion 57 recessed inwardly of the length 10.

With the exception of the edging wires 15, the warp wires 11 are against the outside of the weft wires 12 here, that is to say the side facing outwardly of the length 10.

The length of cable raceway 10 terminates at each end by a farthermost weft wire 12 called end weft wire 16.

The length of cable raceway 10 has a nominal end 17 and a splice end 18 provided with metal wire splicing configured to enable the splice end 18 to be assembled by snap engagement with the nominal end of a similar length of cable raceway.

The metal wires forming the splicing are each formed by folding and are welded onto the length of cable raceway 10.

FIGS. 2 and 3 show the length of cable raceway 10 placed end-to-end with a similar length of cable raceway 10'.

Subsequently, the same numerical references are used for similar parts of the lengths 10 and 10' but followed by "'" for a part of the similar length 10'.

The splice end 18 of the length 10 is assembled by snap engagement with the nominal end 17' of the similar length 10'.

The lengths 10 and 10' are thus in a snap-engaged configuration in which they are held end-to-end.

As can clearly be seen in FIG. 3, the splicing is configured such that in this snap-engaged configuration, a predetermined spacing e is provided between the end weft wire 16 of the length 10 and the end weft wire 16' of the length 10'.

This spacing enables the space between the end weft wire 16 of the length 10 and the end weft wire 16' of the similar length 10' to be sufficient to receive possible portions of warp wire 11 or 11' jutting beyond the end weft wire 16 or 16' respectively, given the manufacturing tolerances specific to lengths of cable raceway of metal wire.

The value of this spacing is approximately 6.6 mm here.

As a variant, this value is comprised between 4.5 and 10.0 mm.

As will be explained in more detail later with reference to FIGS. 4 to 6, the snap engagement is carried out by a movement of bringing together the splice end 18 of the length 10 and the nominal end 17' of the similar length 10' in a direction 19 transverse to the bottom 13 of the length 10 and to the bottom 13' of the similar length 10', the splicing, in course of this movement of bringing together, elastically deforming in contact with the similar length 10' then relaxing to retain the similar length 10'.

Several lengths of cable raceway such as the lengths 10 and 10' may thus be assembled end-to-end to construct a cable raceway 100 (FIGS. 2 and 3).

Here, the cable raceway 100 is provided to run along a ceiling or another structure having a surface located over the space in which the cable raceway 100 is to be located.

Along the ceiling or other structure, the bottom 13, 13' is provided to be horizontally oriented, with the side walls 14, 14' being turned upwardly, including when the ceiling or other structure is inclined.

The fastening of the cable raceway 100 to the structure such as a ceiling may be carried out for example using brackets, which are not shown here.

As can be seen in FIGS. 1 and 2, the splicing comprises a bottom part 20 located on the bottom 13 of the length 10, and two lateral parts 21 each located on a respective side wall 14.

The bottom part 20 here comprises two stop members 22 each disposed at the foot of a respective side wall 14.

As can be seen in FIGS. 2 and 3, each stop member 22 is configured here to cooperate with the ceiling 13' of the nominal end 17' of the similar length 10' to oppose the continuation of the movement of bringing together by which the snap engagement of the length 10 with the similar length 10' is carried out, when the latter is end-to-end with the length 10.

Each stop member 22 is furthermore configured here to retain to the length 10 the end weft wire 16' of the similar length 10'.

Each lateral part 21 comprises a head 33 and a flexible arm 34 having a distal end 35 connected to the head 33 and having a proximal end 36 assembled to the length 10 (FIG. 3), here by being fastened thereto.

The head 33 extends from a rear end 39 located adjacent the end weft wire 16 that faces in the longitudinal direction towards the nominal end 17, to a front end 40, which is an opposite end to the rear end 39, located adjacent the end weft wire 16 which faces in the longitudinal direction away from the nominal end 17.

Furthermore, when the lengths 10 and 10' are in snap-engaged configuration, the front end 40 is located adjacent the weft wire 16' which faces in the longitudinal direction towards the nominal end 17' of the similar length 10'.

Here, the rear end 39 is that by which the head 33 connects to the flexible arm 34, and the front end 40 is formed by one of the free ends of the single metal wire here forming the lateral part 21.

The head 33 comprises a ramp portion 37 and a rider 38 connected to the ramp portion 37.

As can be seen in FIGS. 1 to 3, each lateral part 21, in an unbiased condition, takes a configuration in which the rider 38 is under the edging wire 15 in a position suitable for retaining together the end weft wire 16 of the splice end 18 of the length 10 and the end weft wire 16' of the nominal end 17' of the similar length 10'.

It will be noted that when the lengths 10 and 10' are in snap-engaged configuration (FIGS. 2 and 3), the rider 38 is furthermore under the edging wire 15' of the nominal end 17' of the similar length 10' since the edging wires 15 and 15' are at the same level.

Each lateral part 21 comprises, in addition to the head 33 and the flexible arm 34, a spacer 41 mechanically connected to the end weft wire 16 of the splice end 18 of the length 10.

The spacer 41 is located relative to the head 33 such that, in the longitudinal direction, the rider 38 extends on opposite sides of the spacer 41, and such that the ramp portion 37 is located adjacent the spacer 41 that faces away from the end weft wire 16'.

When the lengths 10 and 10' are in snap-engaged configuration, the spacer 41 is located between the end weft wire 16 of the splice end 18 of the length 10 and the end weft wire 16' of the nominal end 17' of the similar length 10'; the spacer 41 more specifically being against the end weft wire 16' of the nominal end 17'.

The assembly by snap engagement of the splice end 18 of the length 10 with the nominal end 17' of the similar length 10' will now be described with reference to FIGS. 4 to 6.

The length 10 and the similar length 10' are oriented in the same direction and disposed such that the nominal end 17' of the length 10' is oriented towards the splice end 18 of the length 10, the spacing between the length 10 and the length 10' being in the direction 19.

The length 10' is positioned in stopped engagement against the spacer 41, under the ramp portion 37 and centered between the respective front ends 40 of the lateral parts 21.

The splice end 18 and the nominal end 17' are then brought towards each other in the direction 19.

The head 33 and the flexible arm 34 are configured such that, during this movement of bringing together, the edging wire 15' of the nominal end 17' of the similar length 10' encounters the ramp portion 37 and drives it to move the rider 38 away from its position under the edging wire 15 by elastic deformation of the flexible arm 34 (FIGS. 5 and 6), until the edging wire 15' of the nominal end 17' of the similar length 10' has passed beyond the ramp portion 37, the flexible arm 34 then relaxing while bringing the rider 38 back to its position under the edging wire 15 (FIGS. 2 and 3).

The splice end 18 of the length 10 and the nominal end 17' of the similar length 10' are then assembled.

Figure 7:
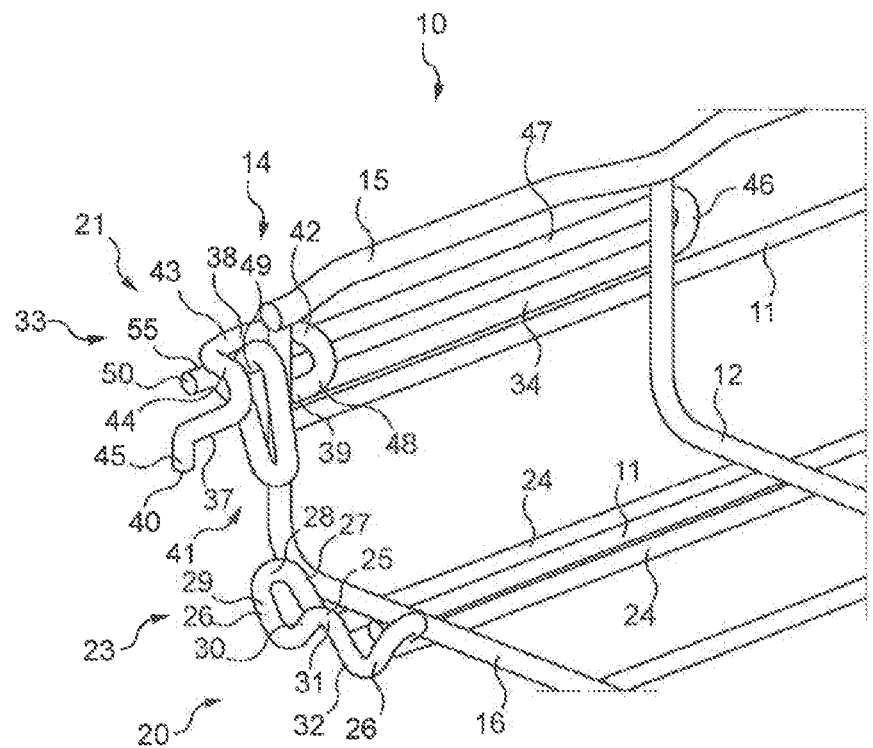
FIG. 7 is an enlargement view of the portion of the splice end located on the left in FIG. 1.
Figure 8:
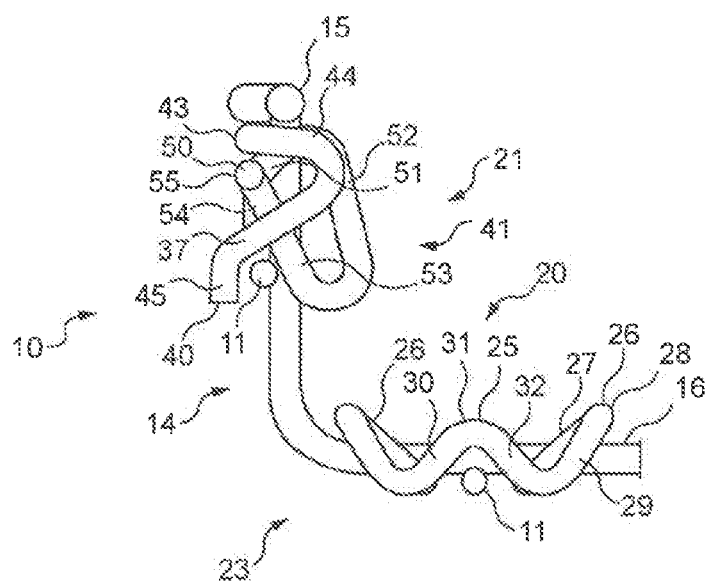
FIG. 8 is an enlargement view of the portion of the splice end located on the left in FIG. 1.

A description will now be given in more detail of the bottom part 20 and the lateral parts 21 of the splicing, furthermore making reference to FIGS. 7 and 8.

It will be noted that in FIGS. 1 to 4, 7 and 8, the lateral parts 21 are in a configuration which they adopt in an unbiased condition.

The stop members 22 of the bottom part 20 are each here formed by a single metal wire and are identical here.

Each stop member 22 comprises a bow 23 and two straight lateral branches 24 each extending from a respective end of the bow 23.

The lateral branches 24 are each welded both to the end weft wire 16 and to the weft wire 12 preceding it. The lateral branches 24 are located here adjacent the bottom 13 that faces towards the outside of the length 10.

The lateral branches 24 here extend parallel to each other and are disposed on opposite sides of a warp wire 11.

The bow 23 comprises a central arch 25 and two horns 26 each extending from a respective end of the arch 25 to an end of a respective straight lateral branch 24.

Each horn 26 has, from the lateral branch 24 to the arch 25, a rear branch 27, a bottom 28 and a front branch 29 which are arranged in the form of a hairpin.

The horn 26 and the lateral branch 24 which extend from one of the ends of the arch 25 are arranged in mirror image of the horn 26 and of the lateral branch 24 which extend from the other of the ends of the arch 25.

The horns 26 are oriented in respective directions that diverge. In particular, the one of the horns 26 which is closest to the side wall 14 at the foot of which the stop member 22 is located, is inclined here upwardly and towards that side wall 14, and the other horn 26 of the stop member 22 is inclined upwardly and towards the other side wall 14.

The arch 25 has, going from the horn 26 that is closest to the side wall to the other horn 26, a first branch 30, a bottom 31 and a second branch 32 which are arranged in a V-shape.

As can be seen in FIGS. 2 and 3, for each horn 26, the space located between its back branch 27 and its front branch 29 is configured to receive the end weft wire 16' of the similar length of cable raceway 10', whereas the space located between the first branch 30 and the second branch 32 of the arch 25 is configured to receive a warp wire 11' of the similar length of cable raceway 10'.

In snap-engaged configuration of the lengths 10 and 10', the length 10' is thus held at its bottom 13' in the longitudinal orientation, in both directions, since the end weft wire 16' comes respectively into stopped engagement against the back branch 27 and the front branch 29 of each of the horns 26; and in the transverse orientation 19 of the bottom 13, 13' upwardly, since the end weft wire 16' comes into stopped engagement against the bottom 31 of each of the horns 26 and since the warp wire 11' received between the branches 30 and 32 comes into stopped engagement against the bottom 31 of the arch 25.

Each lateral part 21 is formed here by a single metal wire and is arranged here as a mirror image of the other lateral part 21.

Therefore, the description of one lateral part 21 applies mutatis mutandis to the other lateral part 21.

The lateral part 21 has an elongate general shape oriented in the longitudinal direction.

The lateral part 21 comprises a U-shaped base having a bottom 46 and two arms each extending from a respective end of the bottom 46, that is to say an upper arm 47 which connects to the spacer 41 and a lower arm which connects to the head 33 by its rear end 39 and forms the flexible arm 34.

The U-shaped base is located here between the edging wire 15 and the warp wire 11 which precedes it, and is against the outside of the end weft wire 16 and of the weft wire 12 that precedes it, that is to say the side facing outwardly of the length of cable raceway 10.

The bottom 46 is curved here. The upper arm 47 and the lower arm 34 are straight here, oriented in the longitudinal direction and parallel to each other.

The upper arm 47 is located between the lower arm 34 and the edging wire 15.

The lateral part 21 is welded to the length of cable raceway 10 by the locations at which the upper arm 47 is against the end weft wire 16 and the weft wire 12 that precedes it, as well as at the location at which the lower arm 34 is against that weft wire 12.

As the lower arm 34 is not welded to the end weft wire 16, it can be elastically deformed to move the head 33 outwardly, in particular during the assembly of the lengths 10 and 10' by snap engagement as explained previously.

The rider 38 is located between the upper arm 47 and the edging wire 15.

The rider 38 is U-shaped and has a bottom 43 and two branches extending from a respective end of the bottom 43, which are a back branch 42 and a front branch 44.

The general orientation of the bottom 43 is in a direction parallel to the side wall 14, here in the longitudinal direction.

The back branch 42 and the front branch 44 each extend in a direction transverse to the side wall 14 and inwardly of the length 10, here parallel to each other.

The bottom 43 is located adjacent the end weft wire 16 that faces outwardly of the length 10 and is against that end weft wire 16.

The back branch 42 is located adjacent the end weft wire 16 which faces in the longitudinal direction towards the nominal end 17 of the length 10 and is in immediate proximity to, or even in contact with, that end weft wire 16.

The back branch 42 is furthermore located adjacent the edging wire 15 that faces towards that bottom 13 and is against that edging wire 15.

The front branch 44 is located adjacent the end weft wire 16 that faces in the longitudinal direction away from the nominal end 17 of the length 10.

The front branch 44 is moreover located adjacent the spacer 41 that faces in the longitudinal direction away from the nominal end 17 of the length 10.

Furthermore, when the lengths 10 and 10' are in snap-engaged configuration, the front branch 44 is located adjacent the end weft wire 16' which faces in the longitudinal direction towards the nominal end 17' of the similar length 10' and is in immediate proximity to, or even in contact with, that end weft wire 16'.

In this snap-engaged configuration, the front branch 44 is furthermore located adjacent the edging wire 15' that faces towards that bottom 13' and is against that edging wire 15'.

In snap-engaged configuration of the lengths 10 and 10', the length 10' is thus held at each of its side walls 14' in the longitudinal orientation in both directions, since the end weft wire 16' comes respectively into stopped engagement against the spacer 41 and the front branch 44; in the transverse direction of the side wall 14' outwardly, since the end weft wire 16' comes into stopped engagement against the bottom 43; and in the direction 19 transverse to the bottom 13 downwardly, since the edging wire 15' comes into stopped engagement against the front branch 44.

It will be noted that the forces applied in the longitudinal direction by the end weft wire 16' of the similar length 10' located on the head 33 are transmitted to the length 10 in particular by the rear branch 42 of the head 33 which comes against the end weft wire 16.

The ramp portion 37 extends between an upper end joining the front branch 44 of the rider 38 and a lower end joining the front end 40 of the head 33.

The ramp portion 37 is substantially straight and extends transversely to the plane of the side wall 14 while being oriented in a direction that is inclined here inwardly of the length 10 and upwardly.

Figure 5:
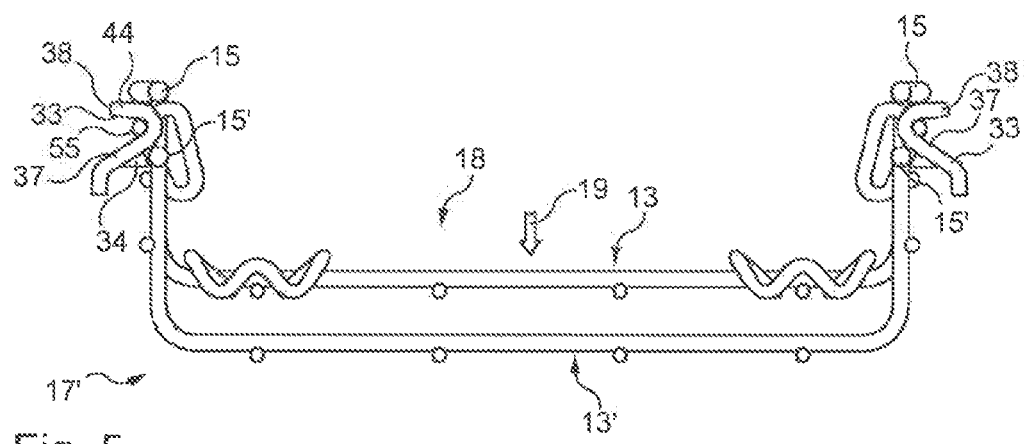
FIG. 5 is a similar view to FIG. 4, the length and the similar length having been brought towards each other in a direction transverse to their bottoms, the similar length being viewed on a transverse section taken flush with the weft wire terminating its nominal end, the nominal end of the similar length acting on the lateral parts for them to elastically deform to make the snap engagement.
Figure 6:
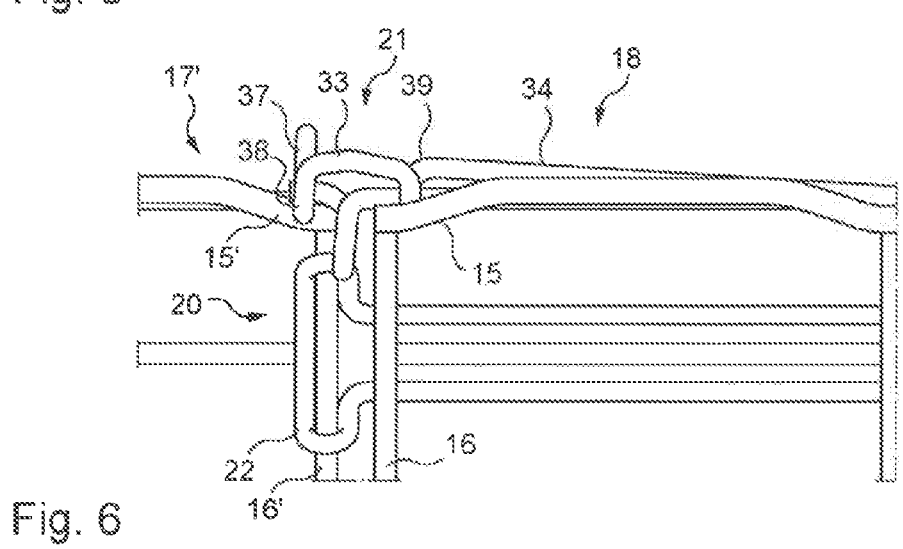
FIG. 6 is a view from above of the splice end and of the nominal end, viewed on the region located to the left in FIG. 5.

As can be seen in FIGS. 5 and 6, this orientation of the ramp portion 37 means that the head 33 moves towards the outside of the length 10 during the assembly of the lengths 10 and 10'.

The front branch 44 and the ramp portion 37 are arranged in a V-shape of which the point is directed here towards where the other side wall 14 is located. The front branch 44 and the ramp portion 37 are located level with each other in the longitudinal direction.

As can be seen in FIG. 3, the lateral part 21 is configured such that in snap-engaged configuration the end weft wire 16' can come not only into stopped engagement against the front branch 44 but also against the ramp portion 37, the latter thus also participating in maintaining the end weft wire 16' relative to the longitudinal direction.

The head 33 comprises, in addition to the ramp portion 37 and the rider 38, a joining branch 48 that extends between an upper end connected to the back branch 42 of the rider 38 and a lower end connecting to the rear end 39 of the head 33.

The joining branch 48 is substantially straight and extends transversely to the plane of the side wall 14 while being oriented in a direction that is inclined here upwardly and inwardly of the length 10.

The back branch 42 and the joining branch 48 are arranged in a V-shape of which the point is directed here inwardly of the length 10.

It will be noted that the space between the back branch 42 and the joining branch 48 is configured to receive the upper arm 47 of the U-shaped base when the head 33 moves outwardly during the assembly of the lengths 10 and 10'.

As can be seen in FIG. 3, the joining branch 48 is in immediate proximity, or even in contact, with the end weft wire 16.

The joining branch 48 thus also participates in the transmission to the length 10 of the forces applied by the end weft wire 16' of the similar length 10' on the head 33, these forces thus being shared between the back branch 42 and the joining branch 48.

The head 33 further comprises a terminal finger 45 which extends from the lower end of the ramp portion 37 to reach the free front end 40 here in a direction parallel to the side wall 14.

In the snap-engaged configuration of the length 10 and 10', the terminal finger 45 extends facing the outside of the warp wire 11' that precedes the edging wire 15' and thus, at the location of each side wall 14', participates in holding the length 10' outwardly relative to the direction transverse to the side wall 14'.

The spacer 41 extends from a rear end 49 joining the upper arm 47 and a front end 50, which is an opposite end to the rear end 49.

The front end 50 is formed by the other free end of the single metal wire here forming the lateral part 21.

The spacer 41 here successively has, from its rear end 49 to its front end 50, a first branch 51, a second branch 52, a third branch 53, a fourth branch 54 and a fifth branch 55, each being straight here.

The first, second and third branches 51, 52 and 53 are arranged in a triangle extending in a plane transversely oriented to the plane of the side wall 14, here with a slight inclination relative to the transverse plane in which extends the end weft wire 16, which inclination is directed towards the end weft wire 16 and outwardly of the length 10 (FIG. 6), this inclination being approximately 5° here.

It will be noted that in the snap-engaged configuration of the lengths 10 and 10', this slight inclination of the triangle part of the spacer 41 means that, on each side of the length 10, the respective spacer 41 opposes a movement of the end weft wire 16' of the length 10' inwardly in the transverse direction The first branch 51 extends from the rear end 49 inwardly of the length 10, while being inclined inwardly of the length 10 and upwardly and extends transversely to the plane of the side wall 14.

The second branch 52 extends from the first branch 51 towards the bottom 13 while being inclined inwardly of the length 10 and towards the bottom 13 and is entirely located between the two side walls 14 of the length 10.

The third branch 53 extends from the second branch 52 towards the rear end 49 while being inclined inwardly of the length 10 and towards the bottom 13 and extends transversely to the plane of the side wall 14.

It will be noted that in the snap-engaged configuration of the lengths 10 and 10', the end weft wire 16' comes into stopped engagement both against a region of the first branch 51 and against a region of the third branch 53, and that these regions are at a certain distance from each other, which enables a good distribution of the force applied by the weft wire 16' against the spacer 41 in the longitudinal direction.

The fourth branch 54 extends from the third branch 53 while being inclined outwardly of the length 10 and towards the bottom 13 like the third branch 53, and while furthermore being inclined towards the end weft wire 16.

It will be noted that in the snap-engaged configuration of the lengths 10 and 10', the fourth branch 54 participates in holding the length 10' outwardly in the transverse direction of the side wall 14, since the end weft wire 16' comes into stopped engagement against the fourth branch 54.

The fifth branch 55 extends from the fourth branch 54 and away from the end weft wire 16, while being oriented in the longitudinal direction. The main part of the fifth branch 55 is located longitudinally level with the front branch 44 of the rider 38 and with the ramp portion 37.

As can be seen in FIG. 5, the space between the front branch 44 and the ramp portion 37 is configured to receive the fifth branch 55 when the head 33 moves outwardly during the assembly of the lengths 10 and 10'.

The lateral part 21 is furthermore configured in order for the portion of the head 33 located at the junction between the ramp portion 37 and the front branch 44 to come into stopped engagement against the fifth branch 55 when the head 33 is displaced outwardly, in particular on assembly of the lengths 10 and 10'; and furthermore here in order for the portion of the head 33 located at the join between the joining branch 48 and the back branch 42 to come into stopped engagement against the upper arm 47 (FIG. 6). This makes it possible to avoid excessive deformation of the flexible arm 34 to the extent of no longer being elastic.

It will be noted that the force applied by the head 33 on the fifth branch 55 is mainly taken up by the deformation of the spacer 41 and does not modify, or only slightly modifies, the angular position of the side wall 14 relative to the bottom 13.

It will furthermore be noted that the lateral part 21 may be configured such that in an unbiased condition (FIGS. 1 to 4, 7 and 8), the flexible arm 34 is pre-stressed and such that the bottom 43 of the rider 38 therefore applies a force against the end weft wire 16, as well as on the end weft wire 16' in the snap-engaged configuration of the lengths 10 and 10'.

To assemble the lengths of cable raceway 10 and 10', each lateral part 21 is made to deform so as to displace the rider 38 from its position under the edging wire 15 and 15' by deformation of the flexible arm 34, then the lengths 10 and 10' are moved away from each other in the direction 19 transverse to the bottom 13 of the length 10.

Figure 9:
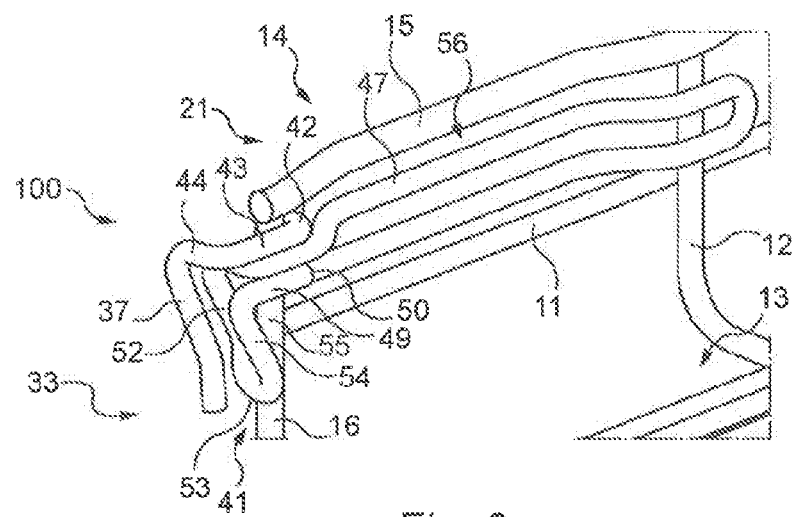
FIG. 9 is a similar view to FIG. 7 but for a variant of the length of cable raceway.
Figure 10:
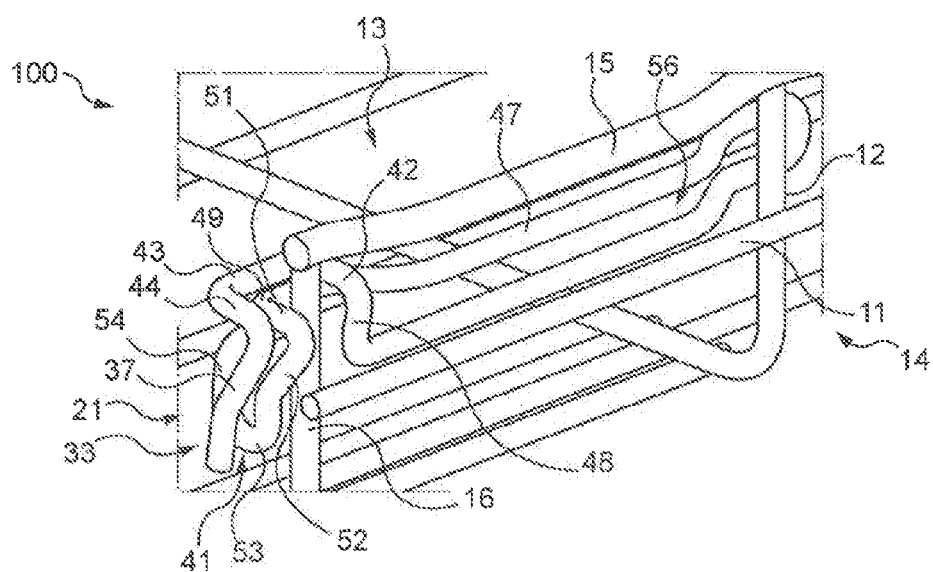
FIG. 10 is an enlargement view of the portion of the splice end located on the right in FIG. 1, but for a variant of the length of cable raceway illustrated in FIG. 9.

The length of cable raceway 100 illustrated in FIGS. 9 and 10 is identical to the length 10 except that its lateral parts 21 are arranged differently.

The U-shaped base of the lateral part 21 is against the inside of the end weft wire 16 and of the weft wire 12 that precedes it, that is to say the side facing inwardly of the length of cable raceway 100.

The U-shaped base furthermore has, between the end weft wire 16 and the weft wire 12 preceding it, a portion 56 jutting outwardly of the length 100 which is located, in the direction transverse to the side walls 14, level with the warp wires 11.

The joining branch 48 (FIG. 10) is located in the jutting portion 56 and is oriented parallel to the plane of the side wall 14.

The bottom 43 of the rider 38 is located adjacent the end weft wire 16 that faces inwardly of the length 100.

The back branch 42 and the front branch 44 each extend from the bottom 43 towards the outside of the length 100.

The ramp portion 37 is inclined here outwardly of the length 100 and upwardly, such that the head 33 moves inwardly of the length 100 during the assembly of the length 100 with a similar length (not shown).

The spacer 41 here successively has, from its end 49 by which it connects to the upper arm 47 to its opposite end 50, a first branch 51, a second branch 52, a third branch 53, a fourth branch 54 and a fifth branch 55, each here being straight except for the third branch 53 which is bent.

The first, second and third branches 51, 52 and 53 extending in a plane oriented transversely to the plane of the side wall 14, here perpendicularly.

The first branch 51 and the second branch 52 are arranged in a V-shape of which the point is directed outwardly of the length 100.

The first branch 51 extends from the end 49 outwardly of the length 100, parallel to the bottom 13 and transversely to the plane of the side wall 14.

The second branch 52 extends from the first branch 51 inwardly of the length 100 while being inclined inwardly and towards the bottom 13. The third branch 53, which is bent, has its concavity oriented towards the first branch 51 and extends transversely to the plane of the side wall 14.

It will be noted that in the snap-engaged configuration of the length 100 with a similar length (not shown), the farthermost weft wire of the nominal end of that similar length comes into stopped engagement both against a region of the first branch 51 and against a region of the bent third branch 53, and that these regions are at a certain distance from each other, this enabling good distribution of the force applied by that farthermost weft wire against the spacer 41 in the longitudinal direction.

The fourth branch 54 extends from the third branch 53, parallel to the plane of the side wall 14, while being inclined towards the end weft wire 16 and towards the bottom 13.

The fifth branch 55 is oriented in the longitudinal direction and extends from the fourth branch 54 towards the nominal end 17 of the length 100.

The fifth branch 55 is welded here to the length 100 at the location at which it is against the end weft wire 16.

It will be noted that in the snap-engaged configuration of the length 100 with a similar length (not shown), the fourth branch 54 and the fifth branch 55 participate in maintaining the similar length outwardly in the direction transverse to the side wall 14, since the farthermost weft wire of the nominal end of this similar length comes into stopped engagement against these fourth and fifth branches 54 and 55.

Figure 11:
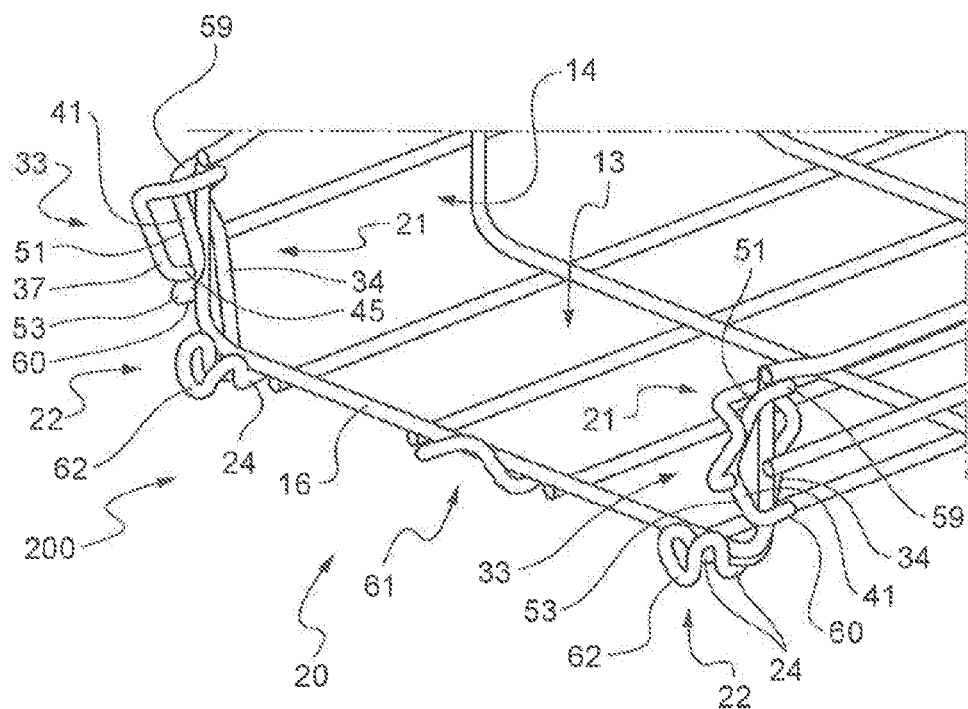
FIG. 11 is a similar view to FIG. 1, but for another variant of the length of cable raceway.

The length of cable raceway 200 illustrated in FIG. 11 is identical to the length 10 except that the splicing is arranged differently.

On each side of the length 200, the head 33, the flexible arm 34 and the stop member 22 which is at the foot of the side wall 14 are formed by a same first metal wire, and the spacer 41 is formed by a second metal wire distinct from the first metal wire.

The spacer 41 has a first branch 51 and a second branch 53 which are arranged in a V of which the point is oriented towards the inside of the length 200, as well as an upper finger 59 and a lower finger 60 which extend respectively from the end of the first branch 51 that is the opposite end to the second branch 53 and from the end of the second branch 53 that is the opposite end to the first branch 51.

The upper finger 59 and the lower finger 60 each extend longitudinally and are each against the outside of the end weft wire 16, to which they are welded.

The first branch 51 is inclined inwardly of the length 200 and towards the bottom 13, while the second branch 53 is inclined towards the outside of the length 200 and towards the bottom 13.

The first branch 51 and the second branch 53 each extend transversely to the plane of the side wall 14.

It will be noted that in the snap-engaged configuration of the length 200 with a similar length (not shown), the farthermost weft wire of the nominal end of that similar length comes into stopped engagement both against a region of the first branch 51 and against a region of the second branch 53, and that these regions are at a certain distance from each other, this enabling good distribution of the force applied by that farthermost weft wire against the spacer 41 in the longitudinal direction.

The head 33 of the lateral part 21 of the length 200 is similar to that of the lateral part 21 of the length 100, except that the terminal finger 45 is longitudinally oriented and extends to the side of the ramp portion 37 where the spacer 41 is located.

The flexible arm 34 is transversely oriented and connects, by its proximal end 36 which is the opposite end to the head 33, to one of the lateral branches 24 of the stop member 22 of the bottom part 20 which is at the foot of the side wall 14.

The proximal end 36 is thus fastened to the bottom 13, here via a lateral branch 24.

As for the length 10, the flexible arm 34 of the length 200 is entirely located to the side of the end of the weft wire 16 which faces the nominal end 17.

The stop member 22 is similar to that of the length 10 except that the main part of its lateral branches 24 are located in the neighborhood of the end weft wire 16 and here are welded exclusively to that wire 16; and the central arch 25 of this bow 23 is replaced by a bridging member 62.

The bottom part 20 here further comprises a spacer 61, similar to the spacer 41 of the lateral part 21 except that its first branch and its second branch extend transversely to the plane of the bottom 13.

Figure 12:
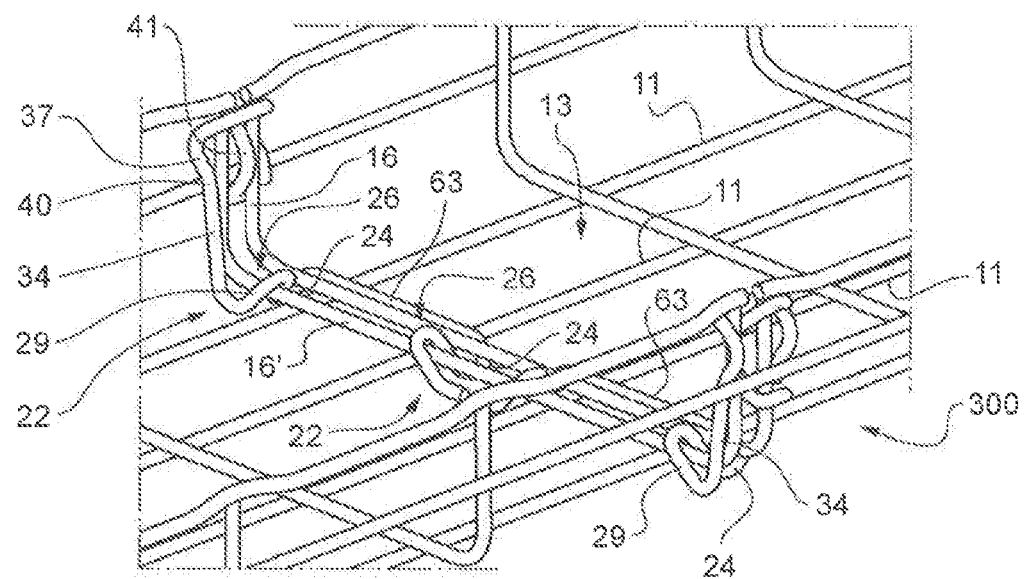
FIG. 12 is a similar view to FIG. 2, but for still another variant of the length of cable raceway.

The length of cable raceway 300 illustrated in FIG. 12 is identical to the length 200 except that the splicing is arranged differently.

The flexible arm 34 is connected to the end 40 of the head 33 which is located adjacent the spacer 41 that faces away from the weft wire 16, that is to say here the lower end of the ramp portion 37, while the other end of the flexible arm 34 is connected to the front branch 29 of one of the horns 26.

The flexible arm 34 is entirely located adjacent the spacer 41 that faces away from the end weft wire 16 and, in snap-engaged configuration of the length 300 with a similar length, is furthermore entirely located adjacent the end weft wire 16' which faces towards the nominal end of that similar length.

The stop members 22 are similar to those of the length 200 except that the horns 26 are connected together via their lateral branches 24 of which the opposite ends to the horns 26 are connected by a bridging member 63.

The lateral branches 24 are curved here with concavity oriented upwards.

The bridging member 63 is straight and oriented parallel to the bottom 13 and is against the side of the weft wire 16 that faces the nominal end 17, as well as against the side of the warp wires 11 that face inwardly of the length 300. The bridging member 63 is welded to the end weft wire 16 and/or at the locations at which it is against the warp wires 11.

The horn 26 of the stop member 22 to which the flexible arm 34 connects is the one of the horns 26 which is the closest to the side wall 14; and this horn 26 is inclined here upwardly and away from that side wall 14.

Figure 13:
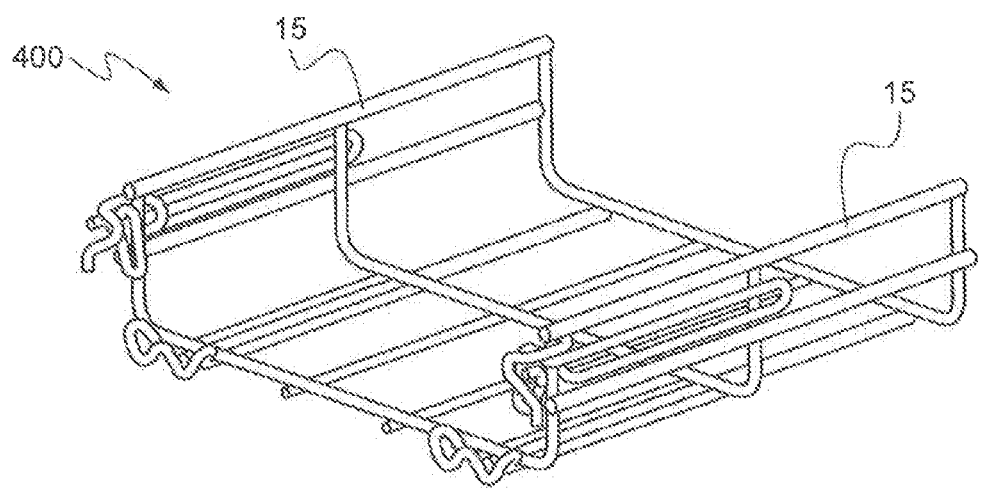
FIG. 13 is a similar view to FIG. 1, but for a variant of the length of cable raceway having straight edging wires rather than portions recessed at the location of each weft wire.

The length of cable raceway 400 illustrated in FIG. 13 is identical to the length 10 except that the edging wires 15 have no recessed portions such as 57 and are straight.

In variants that are not represented:
the proximal end of the flexible arm is not connected to the bottom part and is assembled to the length of cable raceway while being directly fastened to the bottom thereof;
the flexible arm is formed by the upper arm of the U-shaped base rather than by its lower arm, the head thus connecting to the upper arm; and/or
the bottom part has fewer or more than two stop members, for example a single stop member, or three stop members, or even more.

More generally, the invention is not limited to the examples described and illustrated.

The invention claimed is:

1. Length of cable raceway of metal wire trellis, comprising longitudinal warp wires welded to U-shaped transverse weft wires, whereby said length of cable raceway has a bottom and two side walls, said length of cable raceway terminating at each end with a farthermost weft wire, each side wall (14) ending at an apex with a farthermost warp wire called edging wire; said length of cable raceway having a nominal end and a splice end provided with metal wire splicing configured to enable said splice end to be assembled by snap engagement with the nominal end of a similar length of cable raceway in a snap-engaged configuration in which said length of cable raceway and said similar length of cable raceway are held end-to-end, said snap engagement taking place by a movement of bringing together said splice end of said length and said nominal end of said similar length in a direction transverse to said bottom of said length and to said bottom of said similar length, said splicing, in course of this movement of bringing together, elastically deforming in contact with said similar length then relaxing to retain said similar length; said splicing comprising a bottom part and two lateral parts; said bottom part comprising stop members configured to cooperate with the bottom of the nominal end of said similar length to oppose the continuation of said movement of bringing together for said similar length when the similar length is end-to-end with said length; each said lateral part comprising a head and a flexible arm having a distal end connected to the head and having a proximal end assembled to said length, said head comprising a ramp portion and a rider connected to the ramp portion; in an unbiased condition each said lateral part taking a configuration in which the rider is under the edging wire in a position suitable for retaining together the farthermost weft wire of the splice end of said length and the farthermost weft wire of the nominal end of said similar length; said head and said flexible arm are configured such that in the course of said movement of bringing together, the edging wire of the nominal end of said similar length encounters the ramp portion and drives the ramp portion to move the rider away from a position under the edging wire by deformation of said flexible arm, until the edging wire of the nominal end of said similar length has passed beyond said ramp portion, the flexible arm then relaxing while returning the rider to the position under the edging wire;
wherein said head is connected to said flexible arm by one of ends of the head; and each said lateral part comprises in addition to said head and said flexible arm, a spacer mechanically connected to said farthermost weft wire of said splice end of said length, said spacer being located, in said snap-engaged configuration, between said farthermost weft wire of said splice end of said length and said farthermost weft wire of the nominal end of said similar length.

2. The length of cable raceway according to claim 1, wherein said end of said head by which said head connects to said flexible arm is located between the farthermost weft wire of said splice end of said length and the preceding weft wire.

3. The length of cable raceway according to claim 1, wherein in said snap-engaged configuration, said end of said head by which said head connects to said flexible arm is located between the farthermost weft wire of said nominal end of said similar length and the preceding weft wire.

4. The length of cable raceway according to claim 1, wherein said proximal end of said flexible arm is fastened to the side wall of said length with which cooperates said head.

5. The length of cable raceway according to claim 4, wherein said flexible arm extends longitudinally between two warp wires of said side wall of said length.

6. The length of cable raceway according to claim 1, wherein said proximal end of said flexible arm is fastened on the bottom of said length.

7. The length of cable raceway according to claim 6, wherein said proximal end of said flexible arm connects to one of said stop members.

8. The length of cable raceway according to claim 1, wherein said distal end of said flexible arm connects to said ramp portion.

9. The length of cable raceway according to claim 1, wherein said spacer has at least two branches each extending transversely to the plane of the side wall of said length with which said head cooperates.

10. The length of cable raceway according to claim 1, wherein each lateral part is formed by a single metal wire.

11. The length of cable raceway according to claim 10, wherein said lateral part comprises a U-shaped base having a bottom and two arms each extending from a respective end of said bottom, one of said arms forming said flexible arm, the other of said arms connecting to said spacer.

12. The length according to claim 11, wherein said U-shaped base is against the side of said weft wires that faces towards the outside of said length.

13. The length of cable raceway according to claim 1, wherein said head and said flexible arm are formed by a first of said metal wires and said spacer is formed by a second of said metal wires that is distinct from said first metal wire.

14. Assembly comprising a length of cable raceway according to claim 1 and a similar length of cable raceway.

15. The length of cable raceway according to claim 1, wherein said proximal end of said flexible arm is fastened to the side wall of said length with which cooperates said head.

16. The length of cable raceway according to claim 2, wherein said proximal end of said flexible arm is fastened on the bottom of said length.

17. The length of cable raceway according to claim 3, wherein said proximal end of said flexible arm is fastened on the bottom of said length.

18. The length of cable raceway according to claim 4, wherein said proximal end of said flexible arm is fastened on the bottom of said length.

19. The length of cable raceway according to claim 5, wherein said proximal end of said flexible arm is fastened on the bottom of said length.

20. The length of cable raceway according to claim 2, wherein said distal end of said flexible arm connects to said ramp portion.

\* \* \* \* \*